US005667837A

United States Patent [19]
Broomhead et al.

[11] Patent Number: 5,667,837
[45] Date of Patent: Sep. 16, 1997

[54] EDIBLE FAT PRODUCT

[75] Inventors: Rowena Allison Broomhead, Johannesburg, South Africa; Hindrik Huizinga, Maassluis, Netherlands

[73] Assignee: Van den Bergh Foods Co., Division of Conopco, Inc., Lisle, Ill.

[21] Appl. No.: 649,562

[22] Filed: May 17, 1996

[30] Foreign Application Priority Data

May 19, 1995 [EP] European Pat. Off. .............. 95201315

[51] Int. Cl.⁶ ...................................................... A23D 7/00
[52] U.S. Cl. ........................... 426/603; 426/601; 426/607
[58] Field of Search ................................... 426/607, 601, 426/603

[56] References Cited

U.S. PATENT DOCUMENTS

| | | | |
|---|---|---|---|
| 3,607,305 | 9/1971 | Westenberg | 426/607 |
| 3,634,100 | 1/1972 | Fondu | 426/607 |
| 3,949,105 | 4/1976 | Wieske | 426/607 |
| 3,956,522 | 5/1976 | Kattenberg | 426/607 |
| 4,006,264 | 2/1977 | Gooding | 426/607 |
| 4,214,012 | 7/1980 | Ainger | 426/607 |
| 4,341,813 | 7/1982 | Ward | 426/607 |
| 4,366,181 | 12/1982 | Dijkshorn | 426/607 |
| 4,386,111 | 5/1983 | Van Heteren | 426/607 |
| 4,390,561 | 6/1983 | Blau | 426/607 |
| 4,410,557 | 10/1983 | Miller | 426/607 |
| 4,524,086 | 6/1985 | Player | 426/607 |
| 4,716,047 | 12/1987 | Bernoth | 426/607 |
| 4,861,611 | 8/1989 | Baba | 426/601 |
| 4,883,684 | 11/1989 | Yang | 426/607 |
| 4,902,527 | 2/1990 | Galenkamy | 426/607 |
| 5,268,191 | 12/1993 | Crosby | 426/607 |

FOREIGN PATENT DOCUMENTS

| | | |
|---|---|---|
| 0 098 663 | 1/1984 | European Pat. Off. . |
| 0 483 896 | 5/1992 | European Pat. Off. . |
| 2 660 160 | 10/1991 | France . |
| 2 280 449 | 2/1995 | United Kingdom . |
| WO89/070893 | 9/1989 | WIPO . |

OTHER PUBLICATIONS

Swern 1979 Baileys Industrial Oil and Fat Products Wiley--Interscience Publications New York pp. 311–322.

Journal of the American Oil Chemists' Society, vol. 60, No. 2, Feb. 1983, F.V.K. Young, "Palm Kernel and Coconut Oils: Analytical characteristics, Process Technology and Uses", pp. 374–379.

Fette, Seifen, Anstrichmittel, vol. 88. No. 8, 1986, Hamburg DE pp. 294–300.

*Primary Examiner*—Carolyn Paden
*Attorney, Agent, or Firm*—Matthew Boxer

[57] ABSTRACT

Edible plastic fat-product is provided that comprises a continuous fat phase and optionally a dispersed aqueous phase wherein the fat of the fat phase is a fat-composition comprising 20–65% liquid oil and 80–35% structuring fat and having $N_{35}$ of 0–5 and $N_{20}$ of 12–40, the difference between $N_{20}$ and $N_{35}$ being at least 12, preferably 18–30, which composition comprises 0–10% trans fatty acid residues and which comprises 10–50% not-interesterified lauric fat selected from the group consisting of a combination of unhydrogenated and fully hydrogenated lauric fat, partially hydrogenated lauric fat, a combination thereof, and a combination of at least one thereof with other lauric fat.

The choice of this lauric fat allows obtaining a big difference between $N_{20}$ and $N_{35}$, without using fats with a high content of trans fatty acid residues.

9 Claims, No Drawings

EDIBLE FAT PRODUCT

BACKGROUND OF THE INVENTION

The invention relates to edible plastic fat-products comprising a continuous fat phase and optionally a dispersed aqueous phase wherein the fat of the fatphase is a fat-composition comprising 20–65% liquid oil and 80–35% structuring fat which fat composition has an $N_{35}$ of 0–5 and an $N_{20}$ of 12–40 the difference between $N_{20}$ and $N_{35}$ being at least 12, preferably at least 15, more preferably 18–30. $N_t$ indicates the solid fat content of the fat-composition at temperature $t\,°$ C. as measured by NMR. Before measuring, the composition is heated up sufficiently to completely melt it, then it is kept for 1 hour at $0°$ C. and then for 30 minutes at the measuring temperature $t\,°$ C.

Edible plastic fat-products with a continuous fat phase and optionally a dispersed aqueous phase are products such as margarine, shortening and reduced/low fat spreads.

There are also plastic spreads with a continuous aqueous phase. The invention does not relate to this product type, because for such products most product properties, notably the rheology are dominated by the aqueous phase of the product.

Steep melting fat-compositions, i.e. compositions with big differences in solid fat content at $20°$ C. and $35°$ C., containing significant amounts of both liquid oil and structuring fat are used for example for margarines and shortenings primarily intended for cooking and baking and for fat-products intended for spreading for which one cannot rely on a chilled distribution chain. Mainly such products are packed in wrappers e.g. of greaseproof paper, but they can also be packed in tubs.

Such fat products are commonly made from fat-compositions comprising large amounts of partially hydrogenated oil e.g. soyabean oil, rapeseed oil, sunflower oil and possibly fish oil. Such partially hydrogenated oils have very high trans unsaturated fatty acid contents and as a result the trans acid content of the fat-composition typically exceeds 15% and can be even higher than 50%. However, there are substantial groups of customers who prefer products that contain little or substantially no trans fatty acid residues. However, it is very difficult to find fat-compositions with a low content of trans fatty acid residues that have a big difference in $N_{20}$ and $N_{35}$ and that contain significant amounts of liquid oil.

The incorporation of liquid oil is required to provide at least a minimum amount of cis-unsaturated fatty acid residues for nutritional purposes.

JAOCS 60(2), 1983, 374–379 discloses the use of palmkernel and coconut oil in margarines and low-calorie spreads. In refrigerator margarine the fatblend of which contains up to 80% liquid oil, the remaining 20% may be hydrogenated palmkernel or coconut oil as such or interesterified with a second hard component.

GB 2280449 discloses spreads containing fish oil with a variety of measures to prevent off-flavour development. The fat of the spread may contain vegetable oil and hardstock solid at room temperature. The hardstock can be chosen from a wide range of fats including animal fats and fractions thereof, vegetable fats and fractions thereof and hydrogenated or partly hydrogenated vegetable oils and combinations thereof. Amongst the many components listed are hydrogenated or partly hydrogenated coconut oil and palmkernel oil, and coconut oil and palmkernel oil and fractions thereof. WO 89/07893 discloses spreads containing less than 35% fat, containing disaccharide ester and prepared via a special process. The fat can be any fat composed of dairy fat, tallow, lard, hardened fish and marine oil, hardened and unhardened soya, palm, palmkernel, coconut and rape oils and blends thereof.

FR 2660160 discloses spreads containing high contents of liquid oil of a particular composition which spreads do not contain hydrogenated and/or interesterified fats. As hardstock the fat contains 5–50% of fat chosen from a long list of natural hard fats or fractions thereof, including palmkernel oil and coconut oil.

None of these publications is concerned with plastic fat products that must be relatively firm and have a steep N-line. Also none of them, except FR 2660160, addresses the issue of trans unsaturated fatty acid residues in the product.

SUMMARY OF THE INVENTION

We have now found that fat-compositions with a low trans content, a very steep N-line and containing a significant amount of liquid oil that are suitable for making plastic fat products, can be obtained by using a particular type of lauric fat.

Accordingly, the present invention provides an edible plastic fat product comprising a continuous fat phase and optionally a dispersed aqueous phase, wherein the fat of the fatphase is a fat-composition comprising 20–65% liquid oil and 80–35% structuring fat and having $N_{35}$ of 0–5 and $N_{20}$ of 12–40, the difference between $N_{20}$ and $N_{35}$ being at least 12, preferably at least 15, more preferably 18–30 characterised in that the fat composition comprises 0–10% preferably 0–7%, trans fatty acid residues, and that the fat composition comprises 10–50% not-interesterified lauric fat selected from the group consisting of a combination of unhydrogenated and fully hydrogenated lauric fat, partially hydrogenated lauric fat, a combination thereof, and a combination of at least one thereof with other lauric fat.

By lauric fat is meant a fat that comprises at least 35%, preferably 40–60% of lauric acid residues. Such lauric fat is often used as component in interesterified blends together with non-lauric fat, for the purpose of making healthy spreads with very high contents of liquid oil to provide a high content of poly-unsaturated fatty acid residues. However, such products are normally soft.

DESCRIPTION OF THE PREFERRED EMBODIMENTS

For preparing the harder fat-compositions with steep N-lines these interesterified blends are suboptimal. The use of not-interesterified lauric fat in harder products is also known. In the past, coconut oil was included in tallow-based margarine. We found, however, that for obtaining a big difference between $N_{20}$ and $N_{35}$, the use of natural lauric fat such as coconut oil or palmkernel oil did not contribute to the required steepness of the composition. When for example we used palmkernel oil or coconut oil in the structuring fat of the composition we observed an increase in $N_{10}$, but the difference between $N_{20}$ and $N_{35}$ did not increase. Such an increase in $N_{10}$ is not desired because it adversely affects the plasticity of the fat product made with the composition when it is just taken from the refrigerator.

Good results were also not obtained when using fully hydrogenated lauric fat e.g. fully hardened palmkernel oil or fully hardened palmkernel olein. In this case the incorporation adversely affected $N_{35}$. It quickly became too high, causing the organoleptic properties of the product to deteriorate. With the use of the special lauric fats described above we obtained very satisfactory results, a low $N_{35}$, combined with a high $N_{20}$, without $N_{10}$ becoming too high. To obtain the desired results the special not-interestified lauric fat should be present in the fat-composition in an amount of 10–50%, preferably 20–45%.

By structuring fat is meant any fat that contributes to the solid fat content at 20° C. The fat-composition preferably does not comprise fat of animal origin such as tallow, lard or fish oil. Preferably the fat-composition is a vegetable fat-composition, which optionally comprises as fat from non-vegetable origin, only fat derived from milk fat. The $N_{20}$ of the fat-composition preferably is 15–40, more preferably 18–35 particularly 20–33. $N_{35}$ is preferably 0–3.

Preferred embodiments of the fat-product are given in claims 2–8.

Preferred lauric fats are fats derived from palmkernel oil, in particular partially hydrogenated palmkernel oil and a combination of unhardened palmkernel oil and fully hardened palmkernel oil. We found that these lauric fats make particularly good contributions to the properties of the fat-composition. When using partially hydrogenated palmkernel oil, e.g. hydrogenated to a slip melting point of 34°–38° C., especially about 36° C., a particularly steep melting fat-composition can be obtained. Furthermore, we found, such partially hydrogenated lauric oil can have very low contents of trans unsaturated fatty acid residues, e.g. less than 5%, even less than 3%. Therefore, such partially hydrogenated lauric fat contributes only very little to the trans acid content of the fat-composition.

Preferably the structuring fat does not consist solely of the non-interestified lauric fat specified above. To obtain optimal fat-products containing the fat-composition, especially with respect to processability and plasticity of the product it is preferred to include other structuring fat as well. For this, two types of other structuring fat, giving fairly good contributions to the steepness without causing much trans fatty acid residue to be present in the fat-compositions, are preferred, either each on its own or in combination.

The first type is not-interestified but optionally partially hydrogenated fat with a slip melting point of 34°–53° C., preferably 35°–47° C., preferably derived from palm oil and/or cottonseed oil. If the fat is derived from cottonseed oil, preferably it is partially hydrogenated to a slip melting point of 40°–47° C. As fat derived from palm oil, palm oil itself can be used but preferably palm stearin or palm oil or palm olein hydrogenated to a slip melting point of 35°–47° C. is used.

Palmstearine preferably is dry fractionated palm stearin with a slip melting point of 44°–53° C. Combinations of such components can also be used. It was found that the partially hydrogenated components derived from palm oil and cottonseed oil, as indicated, make good contributions to the steepness while having relatively low trans fatty acid contents compared with e.g. partially hydrogenated soybean oil, rapeseed oil or sunflower oil.

The not-interestified, optionally partially hydrogenated fat with a slip melting point of 34°–53° C., preferably 35°–47° C. is suitably applied in the fat composition in an amount up to 35%, preferably in an amount of 5–25%.

The second type of other structuring fat that can beneficially be employed is substantially trans fatty acid free interestified fat. Substantially trans free means having a content of trans fatty acid residues of less than 3%, preferably 0–1%. Preferred such fats comprise fat derived from lauric fat and palm oil. For example interestified blends of palmkernel or coconut oil with palm oil or palmstearine can suitably be used. Preferred interestified components are components which have not been subjected to hydrogenation.

Such substantially trans fatty acid free interestified fat can suitably be applied in the fat-composition at a level of up to 40%, preferably it is used in an amount of 8–30%.

As liquid oil, oil substantially liquid at 20° C., preferably 10° C., e.g. cottonseed oil, sabayon oil, rapeseed oil, maize oil, sunflower oil, etc., and mixtures of such oils can be used. We have found that the presence of liquid oil is essential to obtain good plasticity in e.g. margarine or spreads made with the fat composition, especially if the products are stored at lower temperatures, e.g. in the refrigerator. We have found that the use of structuring fat as described above allows the use of relatively high amounts of liquid oil, for given $N_{20}$, $N_{30}$ and $N_{35}$ values required for the fat composition, thus contributing to the plasticity at low temperature of the fat-product.

Preferably the plastic fat product is shortening, or margarine or another product comprising 35–85%, preferably 60–85% continuous fat phase the balance consisting of dispersed aqueous phase. The fat phase may comprise apart from the fat-composition, other ingredients e.g. emulsifier compositions, flavours, vitamins, etc.. The aqueous phase, if any, may comprise apart from water, milk or ingredients derived therefrom, preservatives, structuring or gelling hydrocolloids, etc.

Throughout this specification, all part and percentages are parts or percentages by weight, unless indicated otherwise.

The trans fatty acid content was measured as described in JAOCS 54 (1977), 208. A description of N-value measurement is given in Fette, Seifen, Anstrichmittel 80, (1978), 180–186. Hydrogenation, interesterification and fractionation can be carried out in conventional manner. Also the plastic fat products can be produced in conventional manner. The way in which aqueous phase, if any, and fat phase are present in the fat product, as continuous phase or as dispersed phase can be assessed by microscopic investigation and/or electrical conductivity measurement.

EXAMPLE 1

A fat-composition was prepared by mixing the following components:

31% soybean oil

17% palmkernel oil

5% palmkernel oil—fully hydrogenated (slip melting point 39° C., I.V. 1.0)

5% cottonseed oil hydrogenated to a slip melting point of 43° C.

19% dry fractionated palm olein hydrogenated to a slip melting point of 35° C.

8% palm oil (smp 37° C.)

15% interestified blend of 40 parts fully hydrogenated palm oil (slip melting point 58° C., I.V. 2) and 60 parts fully hydrogenated palmkernel oil (as above).

The fat-composition had a content of trans saturated fatty acid residues of only 6%. It had the following N-values:

$N_{10}$ 50.3

$N_{20}$ 26.5

$N_{30}$ 8.4

$N_{35}$ 3.9.

Using this fat-composition a fat phase was prepared by mixing:

83.4 parts fat 0.1 part monodiglyceride composition 0.1 part soybean lecithin composition trace β-carotene (20% solution in oil)

trace flavour trace vitamin.

An aqueous phase was prepared by mixing:

15.8 parts water 0.2 parts salt 0.3 parts skimmilkpowder 0.1 part preservative pm citric acid solution (20%, to pH 4.7) trace flavour.

A premix was prepared by mixing 83.6 parts fatphase of 60° C. with 16.4 parts aqueous phase. The resulting mixture was kept at 50° C. Margarine was made from it on a pilot scale votator using a CAAAB sequence with recirculation from after the second A-unit into the entrance of the C-unit, with sieve plates in the B-unit (resting tube). An A-unit is a surface-scraped heat exchanger, a C-unit is a stirred crystallizer. The product exiting from the B-unit had a temperature of 17° C. It was packed in wrappers and stored at 15° C.

A good product was obtained with firmness as measured by cone-penetrometer of 2500 at 10° C., 1600 at 15° C., and 650 g/cm$^2$ at 20° C. The product had good performance in an oil exudation test. It is suitable for distribution at ambient temperature even in warm weather, and has good performance as kitchen margarine, especially for cooking and baking.

EXAMPLE 2

A fat-composition was made by mixing the following components:

28 parts soybean oil 2 parts palmkernel oil 21 parts fully hydrogenated palmkernel oil 10 parts cottonseed hydrogenated to a slip melting point of 43° C.

10 parts dry fractionated palm olein hydrogenated to a slip melting point of 35° C.

29 parts interesterified blend of 40 parts palmkernel oil and 60 parts palm oil.

The fat-composition had a trans acid content of 6% and had the following solid fat contents:

$N_{10}$ 52.5

$N_{20}$ 27.1

$N_{30}$ 7.9

$N_{35}$ 3.2.

Margarine was prepared in a manner similar as described in Example 1, but using as fat, this fat-composition.

The firmness of the product (cone-penetrometer) was 2130 g/cm$^2$ at 10° C., 1300 g/cm$^2$ at 15° C. and 700 g/cm$_2$ at 20° C. No oil exudation was observed. The product had good organoleptic properties.

EXAMPLE 3

A number of fat-compositions containing no interesterified components were prepared using partially hydrogenated palmkernel oil with a slip melting point of 36° C. The compositions, their trans acid contents and N-values were as given below.

| | | | |
|---|---|---|---|
| Sunflower oil | 33 | 46 | 22 |
| part. hydr. palmkernel oil (36° C.) | 30 | 42 | 25 |
| dry fract. palmkernel olein | 16 | — | — |
| palmkernel oil | — | — | 12 |
| dry fract. palm olein (smp 28° C.) | — | — | 20 |
| part. hydr. palm olein (42° C.) | 11 | — | 10 |
| part. hydr. palm oil (43° C.) | 10 | 12 | 11 |
| trans acid content (%) | 6.1 | 2.8 | 5.8 |
| $N_{10}$ | 52.6 | 47.6 | 53.1 |
| $N_{20}$ | 26.0 | 25.6 | 25.2 |
| $N_{30}$ | 6.3 | 7.0 | 7.5 |
| $N_{35}$ | 2.5 | 2.2 | 2.9 |

The fat-compositions are suitable for the preparation of margarine similar to those of Examples 1 and 2. They can also be used for making spreads with different amounts of fat phase and aqueous phase and for making shortenings.

EXAMPLE 4

A particularly steep fat-composition was prepared by mixing the following components:

33% soybean oil

10% palmkernel oil

35% palmkernel oil—fully hydrogenated

10% palm olein hydrogenated to a slip melting point of 35° C.

10% palm oil hydrogenated to a slip melting point of 44° C.

The composition contained 4.8% trans fatty acids and had the following N-values:

$N_{10}$ 0 49.7

$N_{20}$ 29.5

$Na_{30}$ 6.8

$N_{35}$ 2.8.

The composition can be used in ways similar as those in Example 3.

EXAMPLE 5

A fat-composition suitable for making somewhat softer fat-products than those of the preceding examples and having a very low trans acid content was prepared by mixing the following components:

35% soybean oil

19% sunflower oil

36% palmkernel oil partially hydrogenated to a slip melting point of 36° C.

10% of an interesterified mixture of 50 parts fully hydrogenated palmkernel oil and 50 parts fully hydrogenated palm oil.

The trans acid content was 1%, the N-values were:

$N_{10}$ 43.0

$N_{20}$ 21.1

$N_{30}$ 5.0

$N_{35}$ 1.5.

Margarine and the like made of this fat-composition can be packed in wrappers, they are suitable for spreading on bread as well as cooking and baking, have excellent organoleptic properties and are yet firm enough to withstand distribution at ambient temperature in moderate climates and in winter time in sub-tropical climates.

EXAMPLE 6

A fat-composition suitable for making margarine and similar spreads with lower contents of fat phase, suitable to be packed in tubs, was made by mixing the following components:

30% soybean oil

25% sunflower oil

9% rapeseed oil (low erucic acid containing)

30% palmkernel oil hydrogenated to a slip melting point of 36° C.

6% dry fractionated palmstearine (s.m.p. 47° C.).

The fat-composition contained less than 1% trans acid residues and had the following N-values:

$N_{10}$ 32.1

$N_{20}$ 13.0

$N_{30}$ 2.0

$N_{35}$ 0.0.

EXAMPLE 7–8

Fat-compositions with particularly high contents of liquid oil, considering the $N_{20}$ values were prepared by mixing:

|  | Ex. 7 | Ex. 8 |
|---|---|---|
| Soybean oil | 48% | 48% |
| Palm oil hydrogenated to a slip melting point of 42° C. | 12% | 12% |
| Interesterified mixture of 50 parts fully hardened palmkernel oil and 50 parts fully hardened palm oil | 9% | 9% |
| Palmkernel oil hydrogenated to a slip melting point of 36° C. | 31% | — |
| Palmkernel oil | — | 4% |
| Fully hardened palmkernel oil | — | 27% |

|  | Ex. 7 | Ex. 8 |
|---|---|---|
| N10 | 49.6 | 50.4 |
| N20 | 26.2 | 25.3 |
| N30 | 9.2 | 9.9 |
| N35 | 3.0 | 4.8 |
| Trans | 3.1% | 2.2% |

These trials show that with the use of the partially hydrogenated palmkernel oil an even steeper fat composition was obtained than with the combined use of palmkernel oil and fully hydrogenated palmkernel oil. Spreads packed in wrappers is prepared from these fat-compositions in the same way as described in example 1, except that 70 parts of fat phase-composition and 30 parts of aqueous phase composition are used.

EXAMPLES 9–10

Fat compositions for firm tub spreads with a very high content of liquid oil considering the $N_{20}$ values, were prepared by mixing:

|  | Ex. 9 | Ex. 10 |
|---|---|---|
| Sunflower oil | 65% | 65% |
| Palm oil hydrogenated to a slip melting point of 42° C. | 23% | 23% |
| Palmkernel oil hydrogenated to a slip melting point of 36° C. | 12% | — |
| Palmkernel oil | — | 2% |
| Fully hydrogenated palmkernel oil | — | 10% |

The N-values and trans fatty acid residue contents were:

|  | Ex. 9 | Ex. 10 |
|---|---|---|
| N10 | 28.5 | 28.0 |
| N20 | 16.2 | 15.7 |
| N30 | 6.6 | 6.8 |
| N35 | 2.2 | 3.2 |
| Trans | 4.9% | 4.6% |

Using these fat compositions, fat phase compositions and aqueous phase compositions are prepared as described in Example 1. For preparing spreads, 75 parts of fat phase composition and 25 parts of aqueous phase composition are used. The spreads are produced in conventional manner using Votator equipment with an AAC-sequence.

We claim:

1. Edible plastic fat product comprising a continuous fat phase and optionally a dispersed aqueous phase wherein the fat of the fat phase is a fat-composition comprising 20–65% liquid oil and 80–35% structuring fat and having $N_{35}$ of 0–5 and $N_{20}$ of 12–40, the difference between $N_{20}$ and $N_{35}$ being at least 12, which fat-composition comprises 0–10%, trans fatty acid residues, and which fat-composition comprises 10–50% not-interesterified lauric fat selected from the group consisting of A a combination of unhydrogenated and fully hydrogenated lauric fat, B partially hydrogenated lauric fat, C a combination of A and B, and D a combination of at least one of A, B and C with other lauric fat.

2. Product according to claim 1, wherein the fat-composition comprises 20–45% of the lauric fat.

3. Product according to claim 1 wherein the lauric fat is fat derived from palmkernel oil.

4. Product according to claim 1, wherein the fat-composition comprises up to 35%, of not-interesterified, optionally partially hydrogenated fat with a slip melting point of 34°–53° C.

5. Product according to claim 4, wherein the fat with a slip melting point of 34°–53° C. is derived from palm oil and/or cottonseed oil.

6. Product according to claim 1, wherein the fat-composition comprises up to 40% of substantially trans fatty acid free interesterified fat.

7. Product according to claim 6 wherein the interesterified fat is unhydrogenated.

8. Product according to claim 6 wherein the interesterified fat comprises fat derived from lauric fat and palm oil.

9. Product according to claim 1 wherein the difference between $N_{20}$ and $N_{35}$ is at least 15.

* * * * *